2,710,305
SUBSTITUTED METHYLOL ANISOLES

Robert W. Martin, Lafayette, Calif., assignor to General Electric Company, a corporation of New York No Drawing. Application October 4, 1952, Serial No. 313,197

4 Claims. (Cl. 260—613)

This invention is concerned with substituted methylol anisoles and more particularly is concerned with compositions of matter corresponding to the general formula

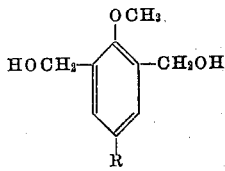

where R is a member selected from the class consisting of the cyclohexyl, the phenyl, and methoxy radicals.

The products herein described can be employed as modifying and plasticizing agents for phenolic resins. In addition, the compositions can be heated, preferably in the presence of an acidic catalyst, such as para-toluene sulfonic acid, sulfamic acid, etc., to give hard products which can be advantageously employed as molding compositions, either with or without fillers. In addition, solutions of the anisoles herein described can be used for coating purposes to deposit films which can be cured to the tack-free state.

In order that those skilled in the art may better understand how the present invention may be practiced, the following examples are given by way of illustration and not by way of limitation. All parts are by weight.

Example 1

The compound para-phenyl phenol dialcohol having the formula

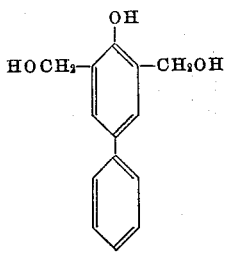

was prepared as follows. About 170 grams of para-phenyl phenol were mixed together with 45 grams of sodium hydroxide dissolved in 200 cc. water and 300 cc. ethyl alcohol. To this mixture were added 67 grams of paraformaldehyde and the mixture heated to around 65° C. for about 3 hours, and thereafter cooled to about room temperature. The reaction mixture was permitted to remain at room temperature for about 24 hours after which 500 cc. of water were added and the entire mixture neutralized with dilute acetic acid. The solid crystalline product was filtered and recrystallized from toluene to give para-phenyl phenol dialcohol melting at around 110–111° C. (literature melting point 110–111.5° C.). Analysis of this compound showed it to contain about 6.35% hydrogen (theoretical 6.14% hydrogen).

About 46 grams of the para-phenyl phenol dialcohol prepared above were thoroughly mixed with 15 grams of sodium hydroxide dissolved in 135 cc. water. The mixture was heated to about 70° C. and thereafter 40 grams of dimethyl sulfate were added and the entire reaction mixture stirred to give an insoluble oil. This oil was removed from the reaction mixture and dissolved in toluene, and the insoluble material filtered. The filtrate obtained was then diluted with hexanae which caused deposition of a crystalline material. This crystalline material was recrystallized from benzene to give the compound 4-phenyl-2,6-dimethylol anisole having the formula

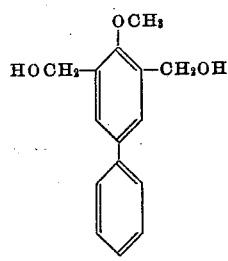

This compound had a melting point of about 102–103.5° C., and when analyzed was found to contain 73.1% carbon and 6.75% hydrogen (theoretical 73.8% carbon, 6.6% hydrogen).

Example 2

In this example para-methoxy phenol dialcohol having the formula

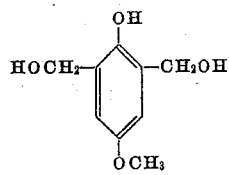

was prepared as follows. A solution was prepared by mixing together 22 grams of hydroquinone monomethyl ether and 10 grams of sodium hydroxide dissolved in 100 cc. water. To this solution were added 14 grams paraformaldehyde while the phenate solution was held at about 45° C. Thereafter, the reaction mixture was maintained at a temperature of about 25–30° C. for 16 hours, and thereafter neutralized with dilute acetic acid. The mixture was then saturated with salt to cause deposition of a crystalline product. The crystalline material was filtered and recrystallized from a mixture of alcohol and benzene to give para-methoxy phenol dialcohol melting at about 128–129° C. (literature melting point 128° C.). Analysis of the latter compound showed it to contain about 58.25% carbon and 6.60% hydrogen (theoretical 58.75% carbon and 6.58% hydrogen).

4-methoxy-2,6-dimethylol anisole having the formula

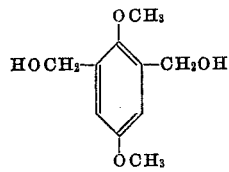

was prepared by mixing together 10 grams of para-methoxy phenol dialcohol and 4.5 grams sodium hydroxide dissolved in 50 cc. water. The mixture was warmed to about 50° C. and thereafter 7.5 grams dimethyl sulfate added, and the reaction mixture stirred for an additional one hour at around room temperature. The reaction product was then saturated with salt to effect precipitation of a crystalline product. The latter crystalline material was filtered off and recrystallized from boiling toluene to give 4-methoxy-2,6-dimethylol anisole melting at around 106–107° C. Analysis of this compound showed it to contain 60.9% carbon and 6.62% hydrogen (theoretical 60.8% carbon and 7.12% hydrogen).

Example 3

The para-cyclohexyl phenol dialcohol having the formula

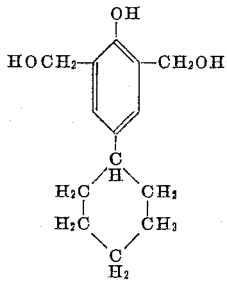

was prepared as follows: 17.6 grams of para-cyclohexyl phenol were dissolved in a solution containing 8 grams of sodium hydroxide and 120 ml. water. The solution was heated to boiling so as to completely dissolve the phenol. The solution was then cooled to 15° C. and to it were added 18 ml. of 40.2% formalin. The reaction mixture was kept at around 15–20° C. for about 3 days. Thereafter, the solution was neutralized with 1N hydrochloride acid, the crystalline product separated and filtered off. The crystals were dried and recrystallized from hot benzene to give crystals having a melting point of about 105–106° C. (literature melting point 106–107° C.). Analysis of this compound showed it to contain about 71.3% carbon and about 8.9% hydrogen and about 26.8% methylol (theoretical 71.2% carbon, 8.49% hydrogen and 26.3 methylol).

4-cyclohexyl-2,6-dimethylol anisole having the formula

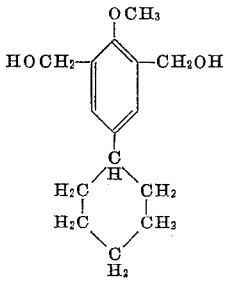

was prepared as follows: 12.5 grams of para-cyclohexyl phenol dialcohol and 3.5 grams sodium hydroxide dissolved in 75 cc. water and 50 cc. methyl alcohol were mixed together and heated to about 70° C. Thereafter, 7.5 grams dimethyl sulfate were added and the reaction mixture heated at reflux for about 50 minutes and thereafter allowed to stand at around room temperature for about 60 hours. The crystalline material which was thus obtained was removed by filtration and heated with a mixture of acetone and alcohol. The residual alcohol and acetone were removed from the filtered crystalline material and the latter dissolved in boiling benzene and thereafter cooled to give a recrystallized product which upon filtration and drying was found to comprise 4-cyclohexyl-2,6-dimethylol anisole. The anisole melted at around 80–82° C. Analysis of the compound showed it to contain 72.6% carbon and 8.98% hydrogen (theoretical 72.3% carbon and 8.88% hydrogen).

To each of the anisoles shown in the foregoing examples was added 0.1%, by weight thereof, sulfamic acid and each sample was heated at 200° C. for varying lengths of time. Heating the 4-methoxy-2,6-dimethylol anisoles for 20 minutes yielded a hard, brittle resin which was substantially insoluble in most solvents. The 4-phenyl-2,6-dimethylol anisole was more resistant to heating and after 5½ hours at 200° C. was slightly tacky, yet still soluble in, for instance, aromatic solvents. Heating of the 4-cyclohexyl-2,6-dimethylol anisole for 15 minutes gave a pale, tan, soft, barely tacky resin; heating of this composition for an additional 45 minutes gave a hard, brittle resin which even after 5½ hours heating at the 200° C. temperature was still hard and had colored only slightly from a very pale tan to an amber color.

What I claim as new and desire to secure by Letters Patent of the United States is:

1. A composition of matter corresponding to the general formula:

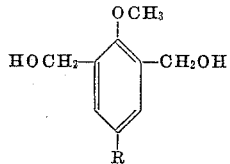

where R is a member selected from the class consisting of the phenyl, cyclohexyl and methoxy radicals.
2. The compound 4-phenyl-2,6-dimethylol anisole.
3. The compound 4-cyclohexyl-2,6-dimethylol anisole.
4. The compound 4-methoxy-2,6-dimethylol anisole.

References Cited in the file of this patent
UNITED STATES PATENTS

| 2,495,232 | Drisch et al. | Jan. 24, 1950 |
| 2,606,929 | Martin | Aug. 12, 1952 |
| 2,636,875 | Martin | Apr. 28, 1953 |